United States Patent [19]

Cook

[11] Patent Number: 4,894,864
[45] Date of Patent: Jan. 16, 1990

[54] INTERFACE CIRCUIT

[75] Inventor: John W. Cook, Ipswich, England

[73] Assignee: British Telecommunications public limited company, London, United Kingdom

[21] Appl. No.: 95,573

[22] PCT Filed: Nov. 19, 1986

[86] PCT No.: PCT/GB86/00707

§ 371 Date: Jul. 14, 1987

§ 102(e) Date: Jul. 14, 1987

[87] PCT Pub. No.: WO87/03440

PCT Pub. Date: Jun. 4, 1987

[30] Foreign Application Priority Data

Nov. 22, 1985 [GB] United Kingdom ............... 8528843

[51] Int. Cl.$^4$ .............................................. H04B 3/03
[52] U.S. Cl. ................................. 379/398; 379/399; 379/340
[58] Field of Search ........ 379/398, 399, 400, 402–405, 379/413, 340, 345

[56] References Cited

U.S. PATENT DOCUMENTS

| | | | |
|---|---|---|---|
| 4,270,027 | 5/1981 | Agrawal et al. | 379/399 X |
| 4,351,060 | 9/1982 | Treiber | 379/398 X |
| 4,380,690 | 4/1983 | Matsufuji | 379/40 Z |
| 4,629,829 | 12/1986 | Puhl et al. | 379/411 X |

FOREIGN PATENT DOCUMENTS 2086196 5/1982 United Kingdom .

OTHER PUBLICATIONS

Miller, Merle; "Am 7950"; *Advanced Micro Devices Data Book*; Sep. 1985; Chapter 2.0–2.4.
Ames, J. R. W.; "Subscriber Line Interfaces", *British Telecommunication Engineering*; vol. 4; Jan. 1986, pp. 203–206.
Ericsson Review, vol. 60, No. 4, 1983, (Stockholm, SE), A. Rydin et al.: "Line Circuit Component SLIC for AXE-10", pp. 192–200, see pp. 192–196.
IEEE Journal of Solid-State Circuits, vol. SC-18, no. 3, Jun. 1983 (New York, US). J. M. Danneels et al., "Monolithic 70 V Bipolar Linedriver IC for PCM SLIC", pp. 316–324, see p. 317.
Ericsson Review, vol. 60, No. 4, 1983 (Stockholm, SE), G. Eriksson et al.: "Line Circuit Component SLAC for AXE 10", pp. 186–191, see p. 190, FIGS. 1–6.

Primary Examiner—Eugene R. LaRoche
Assistant Examiner—Benny Lee
Attorney, Agent, or Firm—Nixon & Vanderhye

[57] ABSTRACT

An analog/digital interface circuit in which an analog terminating impedance is partially synthesized by supplying a digital output (T) signal to a digital input (R) via a digital filter (17). A variable resistive transmission path is connected across the analog ports the resistance of which may be varied along with characteristics of the digital filter in order to simulate any required terminating impedance. The structure facilitates changing $Z_T$ while maintaining the required frequency response and remaining stable.

5 Claims, 4 Drawing Sheets

INTERFACE CIRCUIT

BACKGROUND OF THE INVENTION

1. Field of the Invention

The invention relates to an interface circuit for coding analog signals for digital transmission and decoding digital signals for analog transmission.

2. Discussion of Related Art

The interface circuit is of the type comprising a processing unit, an analog port having a pair of terminals for connection to an analogue loop, a digital output port and a digital input port, said processing unit including an input path between the digital input port and the analog port arranged to convert digital input signls to analog output signals, an output path between the analog port and the digital output port arranged to convert analog input signals to digital output signals and a cross-over path for supplying digital signals derived from analog input signals to the input path wherein the processing unit is arranged to synthesize a component of a terminating impedance across the analogue terminals.

An interface circuit of the aforesaid type is shown in United Kingdom Patent Application 2 086 196 which discloses a circuit for coding an analog signal from a telephone line. The resulting digital signal is processed in combination with an incoming digital signal by means of a digital filter. The output from this filter is then decoded and supplied to the telephone line via a transconductance amplifier. A problem with this circuit is that it may become unstable due to the delay introduced by the analog to digital converter, the digital filter and the digital to analog converter.

Another interface circuit is disclosed in the Ericsson Review of 1983, No. 3, pages 186–191 in which a digital filter synthesizes a terminating impedance in combination with a resistor placed across the analog terminals. This arrangement is suitable for providing a fixed terminating impedance but does not solve the problem of providing a variable terminating impedance particularly if a range of values are desired for which both the real and imaginary components are to be changed. A problem is that in attempting to provide stability for such a circuit it is difficult to maintain the necessary frequency response for each of the available terminating impedances. Thus even if a relatively small number of terminating impedances are available, complex filters must be added to maintain the necessary frequency response.

SUMMARY OF THE INVENTION

An object of the present invention is to provide an interface circuit of the aforesaid type providing a plurality of terminating impedances while providing a satisfactory frequency response.

According to the present invention there is provided an interface circuit of the aforesaid type characterised by a transmission path having variable resistance electrically connected across the analog ports and means for varying both the resistance of the transmission path and characteristics of the processing unit to change the value of the impedance across the terminals of the analog port.

In a preferred embodiment the characteristics of the processing unit are determined by a single variable (K) and the resistance of the transmission path is also varied in relation to the value of said variable. The advantage of this embodiment is that a whole range of terminating impedances may be provided which is only restricted by the resolution of the digital circuitry.

Preferably the transfer function of the digital filter has realizable negative delay and may be implemented as a finite impulse response digital filter. Preferably a digital scaling means having a numerical value equal to the resistive transmission path is in parallel with the finite impulse response filter.

The interface circuit may be employed in a full duplex transmission system.

According to a second aspect of the present invention there is provided a transmission system comprising an analogue loop, means for coding analog signals from said loop to provide a digital output, means for decoding a digital input to supply analog signals to said loop, and a digital filter for supplying a portion of the digital input to synthesize a terminating impedance for the analog loop: characterized by a variable resistive transmission path terminating the analog loop, and means for varying the resistance of said transmission path and for varying characteristics of the digital filter to change the value of the synthesized impedance.

Preferably the variable resistance is a variable gain amplifier.

According to a third aspect of the present invention there is provided a method of interfacing a subscriber's analog loop to a digital input line and a digital output line wherein an analog impedance is simulated by supplying a proportion of the digital output to the digital input via a digital filter: characterized by terminating the analog loop with a variable resistance, and varying said resistance and varying the characteristics of the digital filter to change the value of the simulated impedance.

BRIEF DESCRIPTION OF THE DRAWINGS

The invention will now be described by way of example only with reference to the accompanying drawings of which.

DETAILED DESCRIPTION OF THE PREFERRED EMBODIMENT(S)

Figure 1:
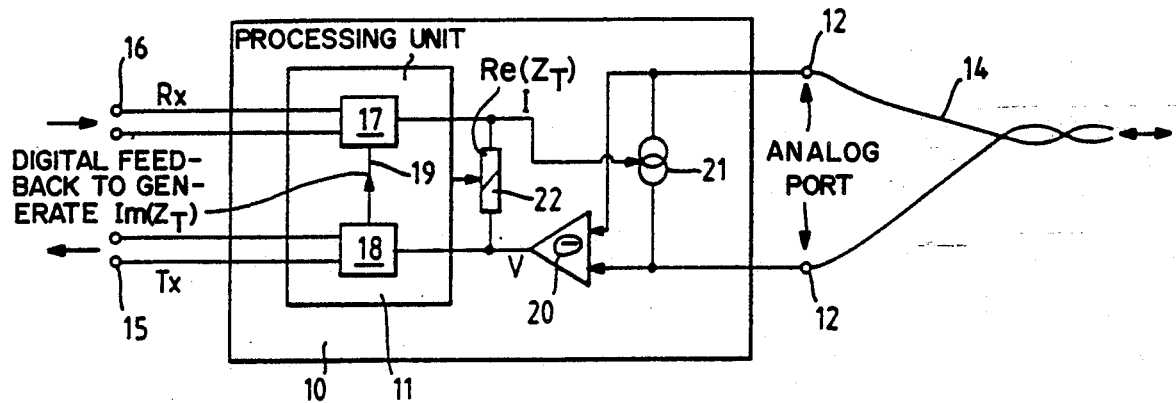
FIG. 1 shows a schematic representation of an improved interface circuit.

An interface circuit 10 is shown in FIG. 1, fabricated as an integrated circuit, including a processing unit 11. The circuit 10 also includes an analog port having a pair of terminals 12 which are connected to an analog loop 14. Analog signals are received from the loop 14 and coded into digital signals which are in turn supplied to a digital output port 15. Similarly digital input signals supplied to a digital input port 16 are decoded and supplied to the port.

In addition to an input path 17, supplying an analogue signal to the analog port in response to digital input signals, and an output path 18, supplying a digital output signal to the digital output port 15 in response to analog input signals, a cross-over path 19 supplies digital signals derived from an analog input signal to the input path. The purpose of this feedback loop is to synthesize the imaginary component of the terminating impedance $Z_T$ for the line.

A difference amplifier 20 has input terminals connected across the analog terminals 12 and provides an input voltage V. An analog output signal is in the form of current generated by a transconductance amplifier 21 in response to an output voltage identified as I.

The real component of the terminating impedance $Z_T$ is provided by a resistive transmission path 22 which provides a feedback path between the input V and the output I. The resistance of path 22 is controlled by a digital signal from the processing unit 11 and the circuit 10 is provided with means for varying both the resistance of the transmission path 22 and characteristics of the processing unit 11 (i.e., the transfer functions of the processing blocks of the unit) to implement changes to the desired terminating impedance seen across the terminals of the analog port.

Figure 2:
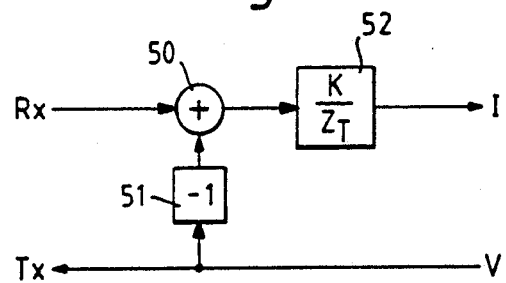
FIGS. 2 to 12 show the steps taken from an ideal system to a working embodiment.

An ideal interface circuit in which a terminating impedance is synthesized in shown is FIG. 2. The analog to digital and digital to analog converters are not present because they are assumed ideal and have a transfer function of 1. The output signal Tx is supplied to an adder 50 via an inverter 51. The adder 50 also receives the input signal Rx and supplies an output to a scaler 52. Scaler 52 has a transfer function of $K/Z_T$, where $Z_T$ is the terminating impedance. However in practice the converters introduce delay and the aforesaid converters have transfer functions of $Z^{-n}$ and $Z^{-m}$ (See FIG. 12). The configuration of FIG. 2 would not respond quickly enough and would therefore be unstable.

The arrangement of FIG. 1 provides a resistive path on the analog side of the converters while retaining the overall transfer function thus ensuring that the required frequency response is retained without adding compensating filters.

Figure 3:
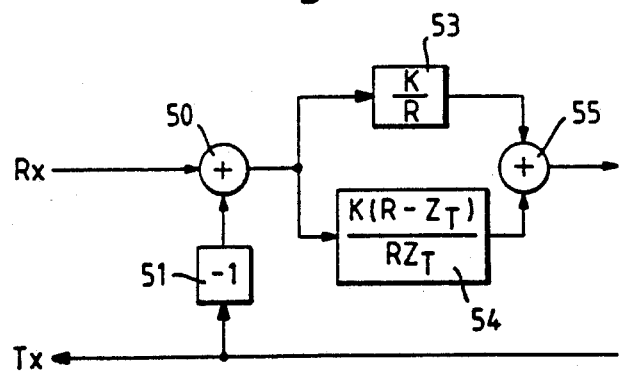

The detailed processing algorithm for the circuit shown in FIG. 1 may be derived from the ideal arrangement of FIG. 2 as follows:

1. Let K/R be the zero delay component of $K/Z_T$. The other component is then $K/Z_T - K/R = K(R - Z_T)/RZ_T$ and the resulting transfer algorithm is shown in FIG. 3. The scaler 52 has been divided into two scalers 53 and 54 the outputs from which are combined by an adder 55.

Figure 4:
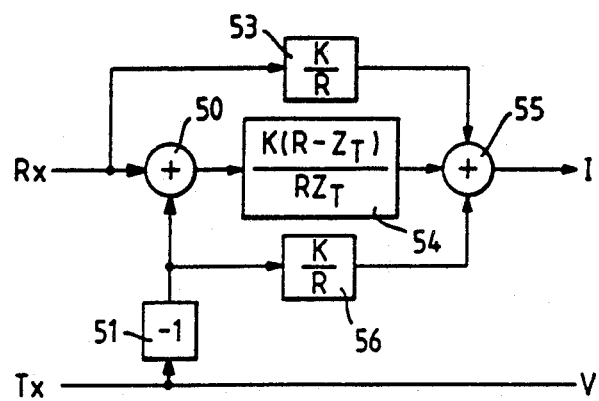

2. The K/R block 53 is moved to the other side of the adder thus necessitating another K/R block 56 as depicted in FIG. 4.

Figure 5:
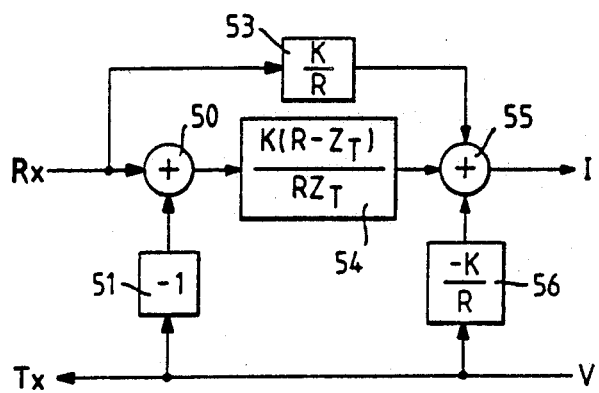

3. The input of K/R block 56 is moved to the other side of the inverter 51 so that it becomes $-K/R$ as depicted in FIG. 5. This is in fact equivalent to a resistive transmission path of value R/K, having regard for the presence of the adder 55 which provides a current output.

Figure 6:
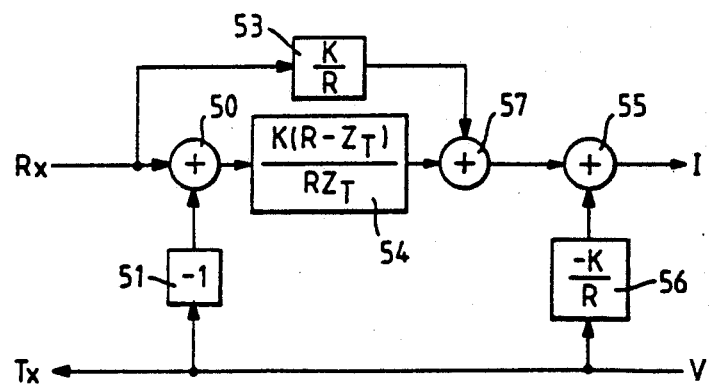

4. The output from scaler 53 is removed from adder 55 by using another adder 57 as depicted in FIG. 6.

Figure 7:
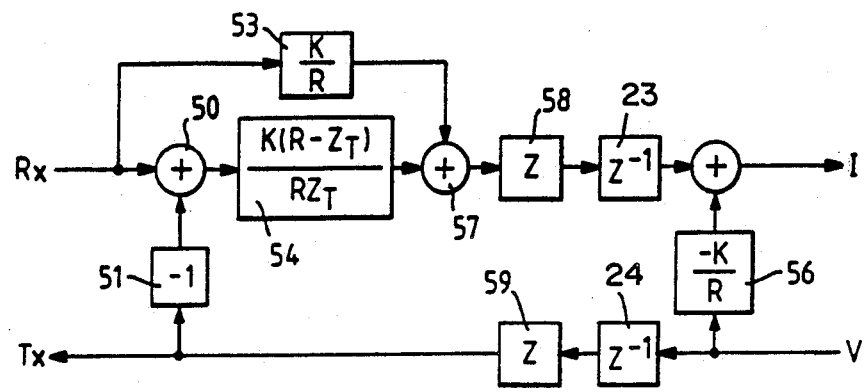

5. The delays due to the converters 23 and 24 are assumed to have a transfer function of $Z^{-1}$ and are inserted to the left of the $-K/R$ block 56 along with negative delays 58, 59 having a transfer function of Z as depicted in FIG. 7.

Figure 8:
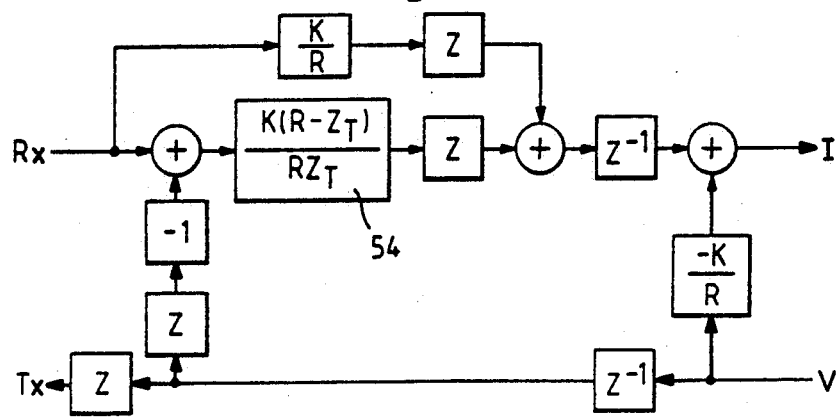
Figure 9:
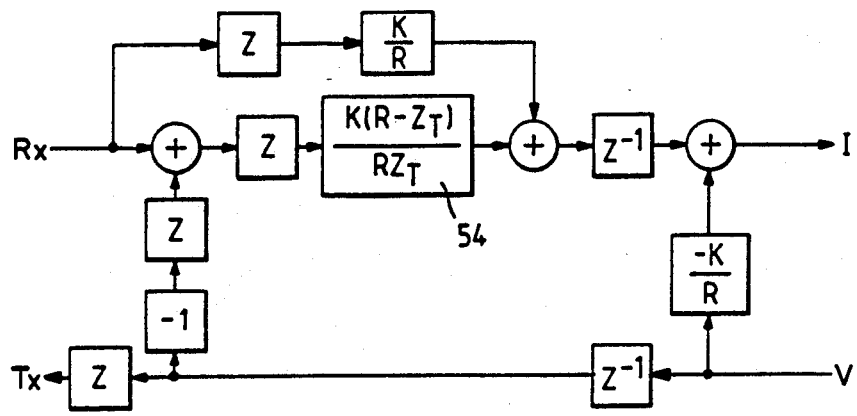
Figure 10:
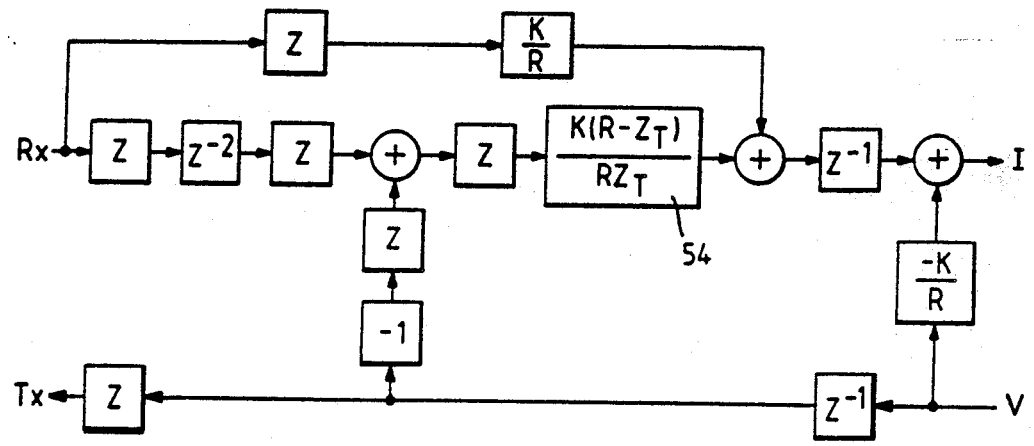
Figure 11:
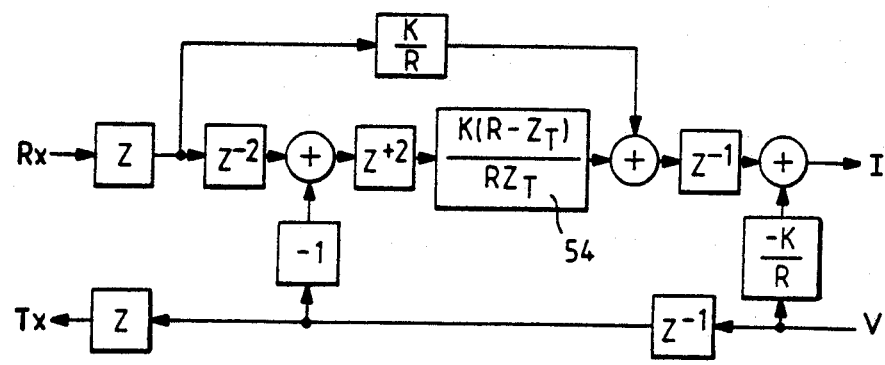

6. The negative delays are moved in order to incorporate them into blocks having non zero-delay components as shown in FIGS. 8 and then 9. In FIG. 10 a double delay and two negative delays are added which may be manipulated as shown in FIG. 11.

7. In FIG. 11 delays D1 and D2 which are in series with the digital input and the digital output are ignored.

8. The double negative delay $Z^2$ is combined with the $K(R-Z_T)/RZ_T$ block 54 if $Z^{-1}$ represents a sufficiently small delay.

Figure 12:
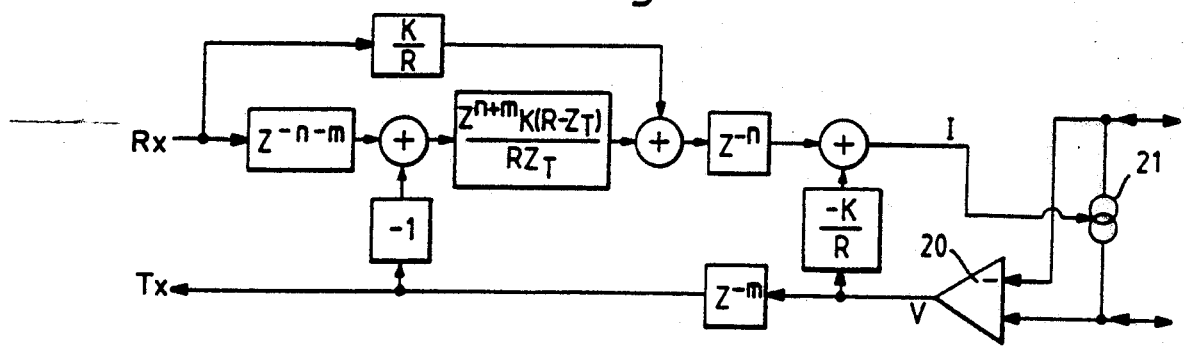

A generalized version is shown in FIG. 12 and if n+m equal 3 then $K(R-Z_T)/R-Z_T$ can be realized by a finite impulse response (FIR) digital filter having the following co-efficients:

| | | |
|---|---|---|
| C1 = C2 = C3 | = | 0 |
| C4 | = | −0.65625 |
| C5 | = | +0.296875 |
| C6 | = | −0.078125 |
| C7 | = | +0.234375 |
| C8 | = | −0.265625 |
| C9 | = | +0.046875 | where the transfer function T of the FIR filter is given by $$T = \sum_{i=1}^{9} C_i \cdot Z^{1-i}$$

The structure of FIG. 1 does not require extra filters in order to achieve the required frequency response, the transfer functions of the block only require one variable to be changed (K) in order to change $Z_T$ while ensuring that the circuit has the required frequency response and remains stable.

I claim:

1. A transmission system comprising:
   an analog loop,
   means for coding analog signals from said loop to provide a digital output,
   means for decoding a digital input to supply analog signals to said loop,
   a digital filtering means for supplying a portion of the digital output to the digital input to synthesize the imaginary component of a terminating impedance $Z_T$ for the analog loop
   characterized by a variable resistance terminating the analog loop and processing means controlling said digital filtering means, said means for coding and said means for decoding and also including means for simultaneaneously changing the resistance of said variable resistance and for changing the transfer function of the digital filtering means such as to change the value of the terminating impedance without substantially changing the frequency response of the transmission system.

2. An interface circuit comprising:
   an analog input/output port having a pair of terminals for connection to an analog loop,
   a digital output port,
   a digital input port,
   a variable resistance electrically connected across the analog input/output port for providing the real component of a terminating impedance $Z_T$ across the analog input/output port terminals,
   a processing unit including an input path between the digital input port and the analog input/output port arranged to convert digital input to analog output signals,
   an output path between the analog input/output port and the digital output port arranged to convert analog input signals to digital output signals,
   a cross-over path for supplying to the input path digital signals derived from analog input signals received at the analog input/output port,
   the processing unit being effectively formed of processing blocks adapted so as to synthesize the imaginary component of the terminating impedance $Z_T$, and said processing unit including impedance changing means for simultaneously changing both the resistance of the variable resistance and transfer functions of the processing blocks such as to change the value of the terminating impedance $Z_T$ without substantially changing the frequency response of the interface circuit, wherein the transfer functions of the processing blocks include a scalar factor and the impedance changing means is arranged effectively to change the value of this scalar factor in the transfer functions and to change the value of the resistance of the variable resistance in accordance with the value of this scalar factor, wherein a said processing block comprises a digital filter having a transfer function including the expression $K(R-Z_T)/RZ_T$ and the resistance of the variable resistance is $R/K$, where K is said scalar factor and R is the real component of the terminating impedance $Z_T$.

3. An interface circuit according to claim 2 wherein the input path comprises a D/A converter, the output path comprises and A/D converter, and the digital filter has a transfer function defined by a series of coefficients and exhibits a time domain response in the form of a comb structure, and wherein the digital filter is so adapted that a number of the lowest coefficients are zero thereby to compensate for delay through said D/A converter and said A/D converter.

4. An interface circuit according to claim 2 wherein a further said processing block is connected in parallel with the digital filter and has a transfer function of K/R.

5. An interface circuit according to any one of claims 4 or 3 in which the digital filter includes a finite impulse response filter.

* * * * *